Dec. 17, 1963   H. S. CLARK   3,114,476
APPARATUS FOR FEEDING WORK PIECES
Filed May 10, 1962   12 Sheets-Sheet 1

INVENTOR.
HARRY S. CLARK
BY
*Schmieding and Fultz*
ATTORNEYS

INVENTOR.
HARRY S. CLARK
BY
Schmieding and Fultz
ATTORNEYS

Dec. 17, 1963 H. S. CLARK 3,114,476
APPARATUS FOR FEEDING WORK PIECES
Filed May 10, 1962 12 Sheets-Sheet 3

INVENTOR.
HARRY S. CLARK
BY Schmieding and Fultz
ATTORNEYS

Dec. 17, 1963   H. S. CLARK   3,114,476
APPARATUS FOR FEEDING WORK PIECES
Filed May 10, 1962   12 Sheets-Sheet 4

INVENTOR.
HARRY S. CLARK
BY Schmieding and Fultz
ATTORNEYS

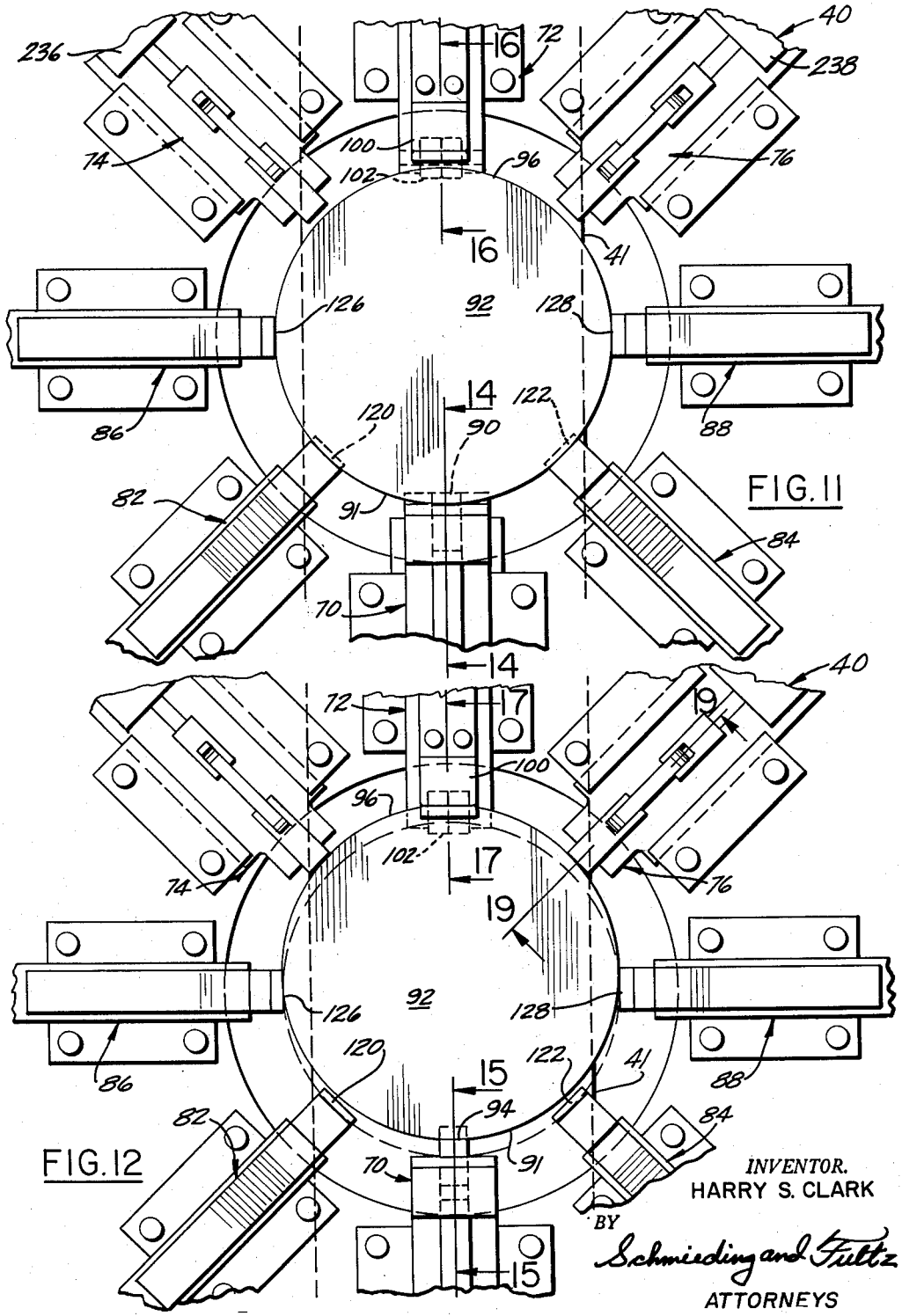

Dec. 17, 1963　　　　　　H. S. CLARK　　　　　　3,114,476
APPARATUS FOR FEEDING WORK PIECES
Filed May 10, 1962　　　　　　　　　　　　　12 Sheets-Sheet 6

*INVENTOR.*
HARRY S. CLARK
BY
*Schmieding and Fultz*
ATTORNEYS

Dec. 17, 1963   H. S. CLARK   3,114,476
APPARATUS FOR FEEDING WORK PIECES
Filed May 10, 1962   12 Sheets-Sheet 7
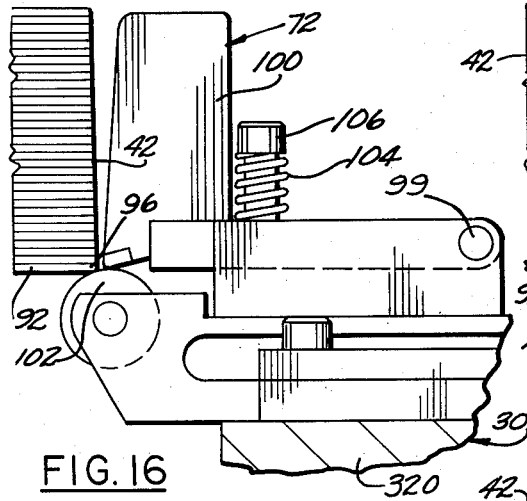
FIG. 16
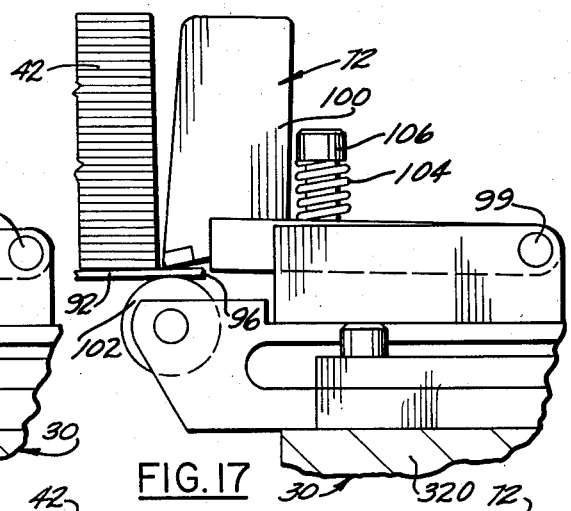
FIG. 17
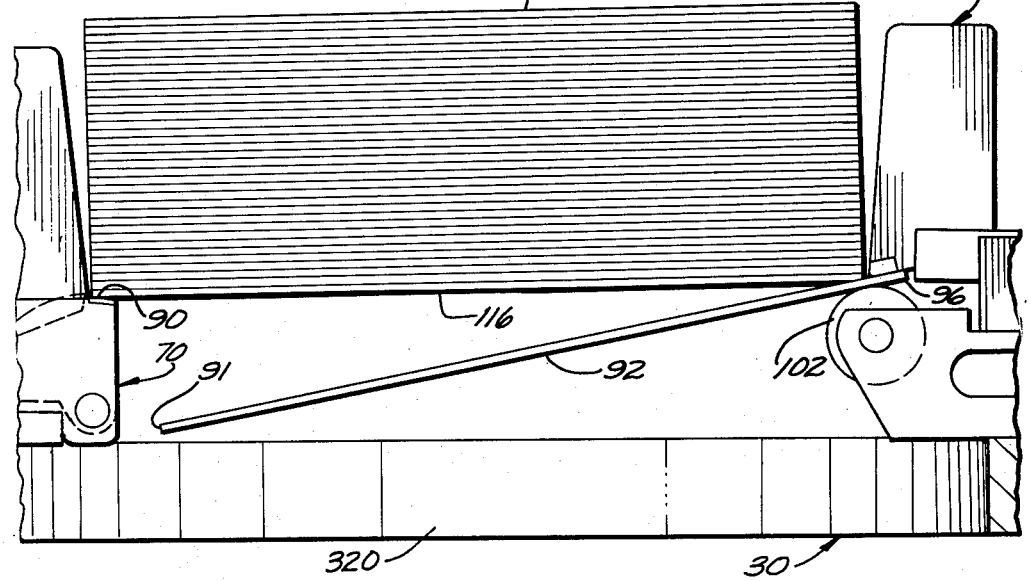
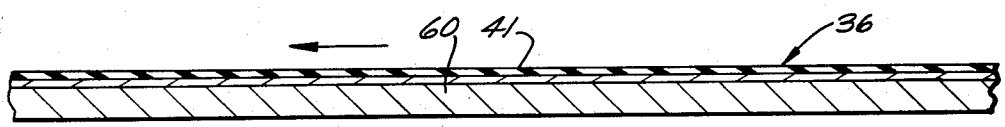
FIG. 18
INVENTOR.
HARRY S. CLARK
BY
Schmieding and Fultz
ATTORNEYS INVENTOR.
HARRY S. CLARK
BY
Schmieding and Fultz
ATTORNEYS Dec. 17, 1963 H. S. CLARK 3,114,476
APPARATUS FOR FEEDING WORK PIECES
Filed May 10, 1962 12 Sheets-Sheet 10
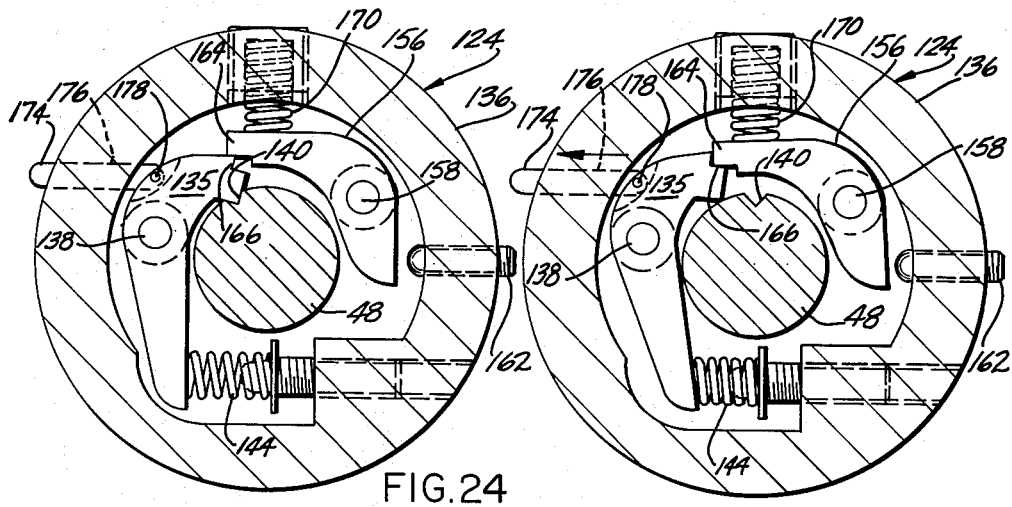
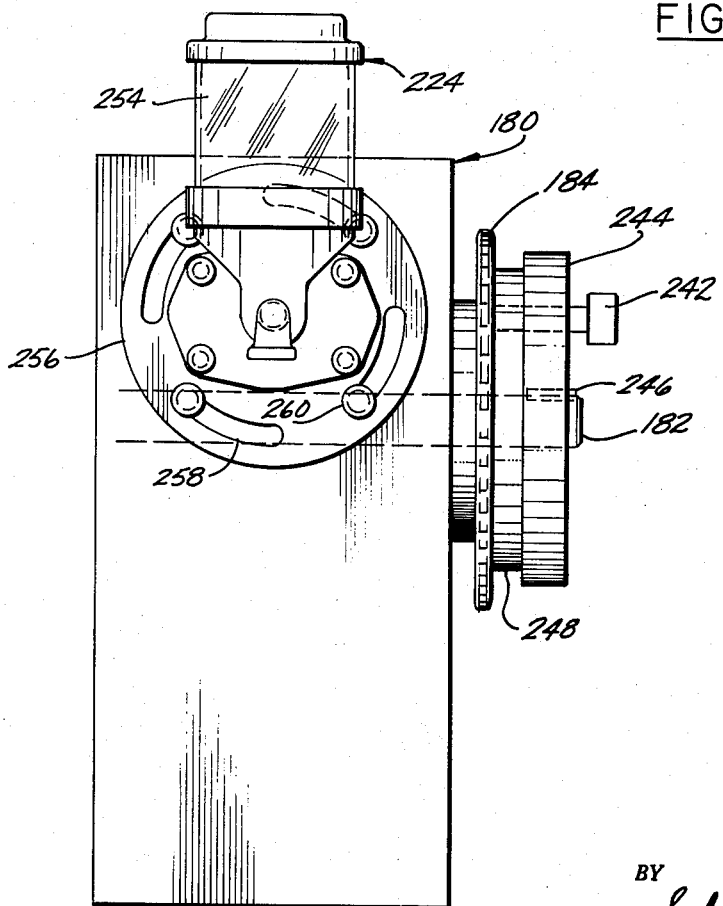
INVENTOR.
HARRY S. CLARK
BY
Schmieding and Fultz
ATTORNEYS

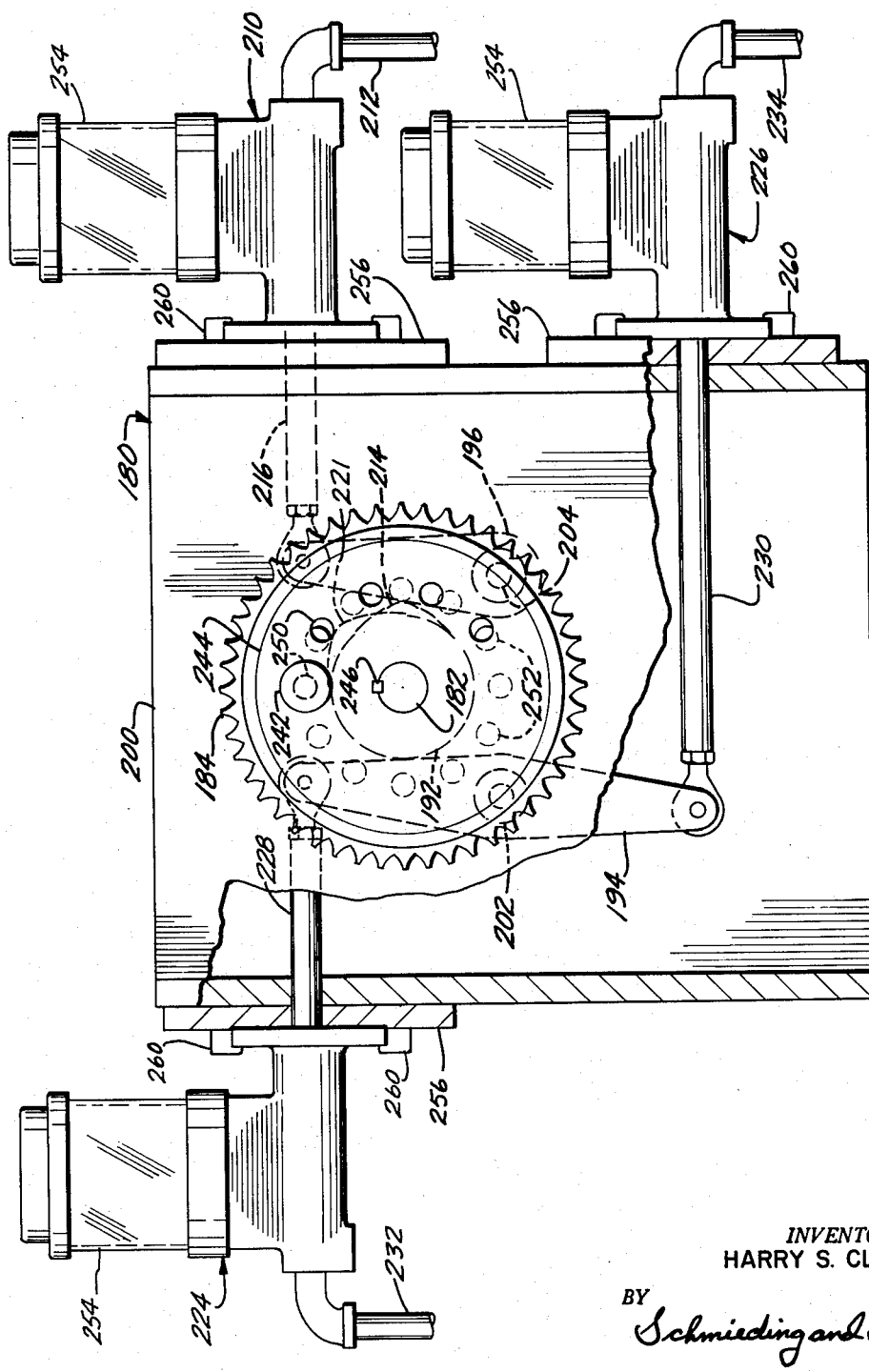

INVENTOR.
HARRY S. CLARK

United States Patent Office 3,114,476
Patented Dec. 17, 1963

3,114,476
APPARATUS FOR FEEDING WORK PIECES
Harry S. Clark, Rte. 3, Delaware, Ohio
Filed May 10, 1962, Ser. No. 187,314
13 Claims. (Cl. 221—225)

This invention relates to apparatus for feeding metal work pieces to machines such as presses or the like.

In general, the apparatus of the present invention comprises a frame means adapted to support a plurality of stacked work pieces above an endless conveyor leading to a punch press or other associated machinery.

The apparatus also includes mechanism for releasing work pieces, one at a time, from the bottom of the stack to the endless conveyor with the release of work pieces being accomplished and precise timed relationship with the cyclical operation of the machine to which the work pieces are being delivered.

As another aspect of the present invention, the apparatus is provided with a novel conveyor drive associated automatic clutch mechanism for arresting movement of the endless conveyor in the event that more than one work piece at a time is released from the bottom of the stack to the endless conveyor.

As another aspect of the present invention the apparatus incorporates a pivotal mounting means for the work piece releasing mechanism conveyor that permits vertical oscilating movement of a free end of the conveyor. This permits the conveyor to be coupled to a vertically oscillating work piece receiving station on the associated machine to which the work pieces are being delivered.

As another aspect of the present invention the apparatus includes a slidably mounted auxiliary frame for supporting the endless conveyor whereby the latter can be adjustably positioned to precisely deliver work pieces to dies of various sizes and at various locations on the associated machine to which work pieces are being delivered.

As another aspect of the present invention the apparatus includes a novel actuating means for operating the work piece releasing mechanism in synchronized relationship with the cyclical movement of the associated machine to which the work pieces are being delivered.

It is therefore an object of the present invention to provide an apparatus for automatically feeding work pieces to an associated machine which apparatus includes a novel mechanism for sequentially releasing stacked work pieces to an endless conveyor leading to the associated machine.

It is another object of the present invention to provide an apparatus of the type described that includes a conveyor drive and clutch release mechanism for arresting movement of the endless conveyor in the event that more than one work piece at a time is released from the stack to the endless conveyor.

It is another object of the present invention to provide an apparatus of the type described that is adapted to sequentially deliver work pieces to a cyclically oscillating work receiving station on an associated machine.

It is still another object of the present invention to provide an apparatus of the type described that includes a novel actuating means for the work piece releasing mechanism adapted to be driven by the associated machine which actuating means drives the mechanism in synchronized relationship with the cyclical movement of the associated machine.

Further objects and advantages of the present invention will be apparent from the following description, reference being had to the accompanying drawings wherein preferred forms of embodiments of the invention are clearly shown.

In the drawings:

FIGURE 11 is a plan view of the work piece releasing machine of FIGURE 7 showing the mechanism in its configuration prior to the releasing cycle;

FIGURE 12 is a second plan view of the article releasing mechanism showing the mechanism after the lowermost blank has been extended by a pusher means;

Figure 13:
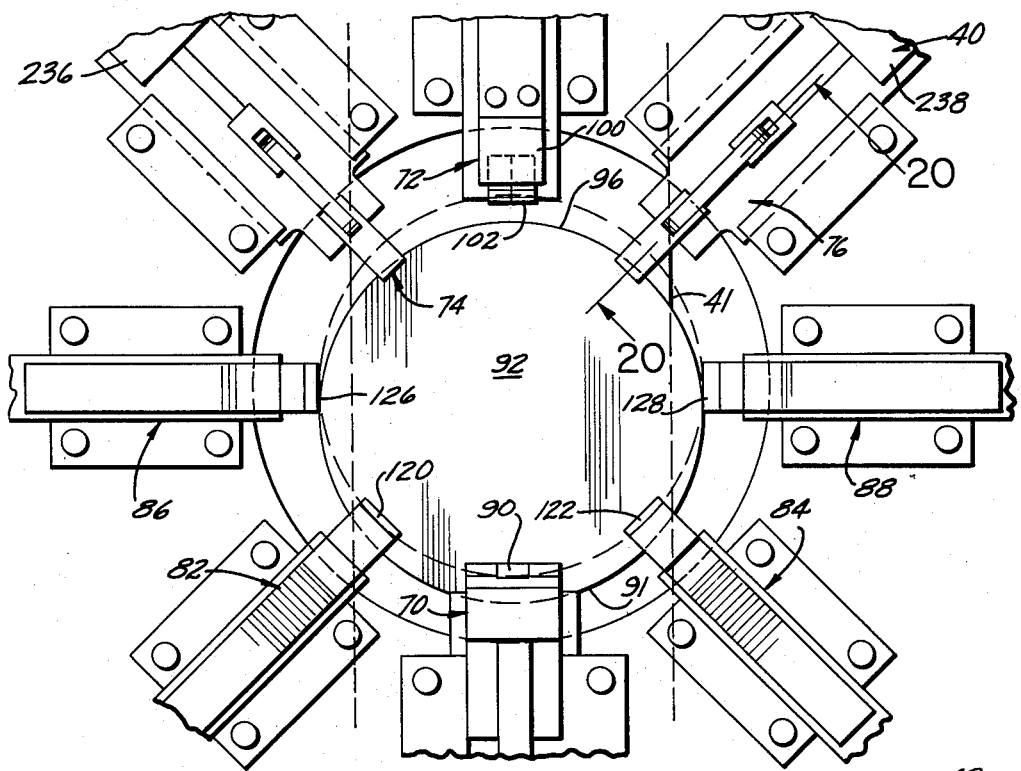
FIGURE 13 is another plan view of the mechanism of FIGURES 11 and 12 which shows the mechanism after the lowermost work piece has been shifted towards the endless conveyor by a kicker means.
Figures 14, 15:
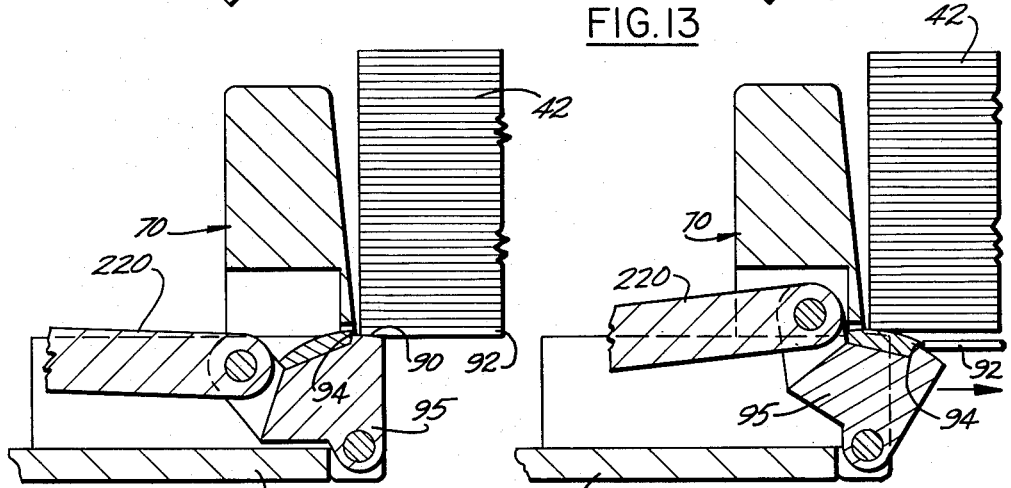

FIGURES 14 and 15 are side sectional views of the pusher means of FIGURES 11-13, the section being taken along the lines 14—14 and 15—15 of FIGURES 11 and 12;

FIGURES 16 and 17 are side elevational views of a gate means comprising a portion of the mechanism of FIGURES 11-13.

Figure 4:
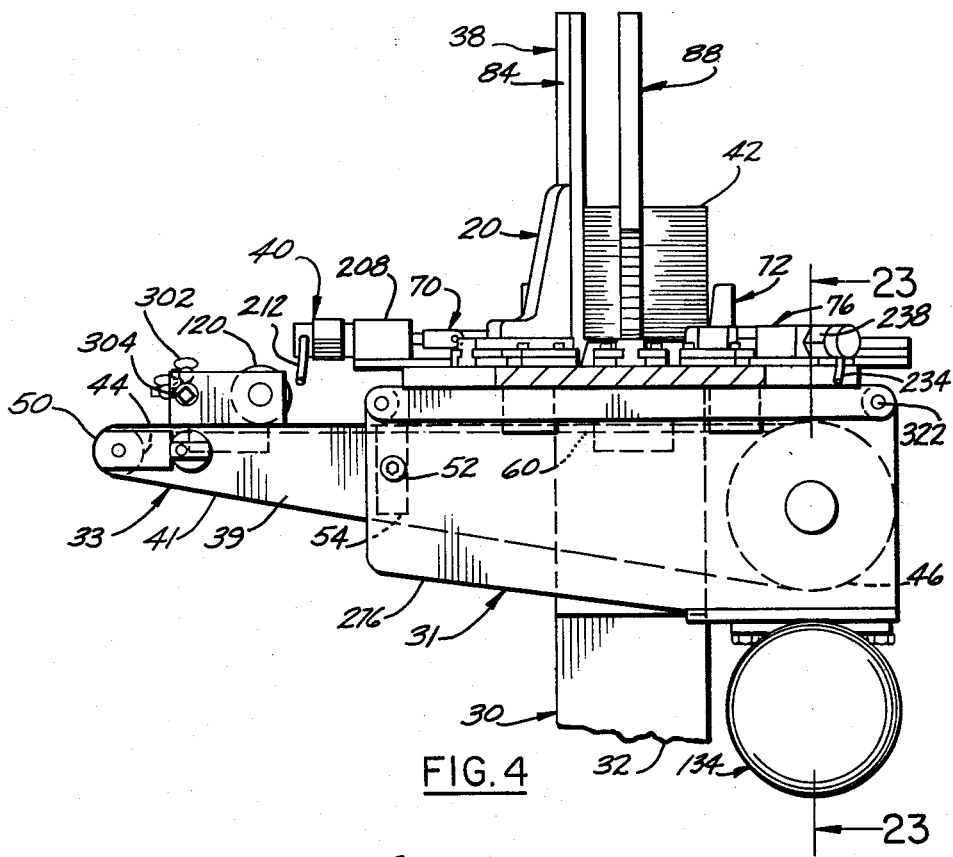
FIGURE 4 is a partial side elevational view of the apparatus of FIGURE 3, the view being taken along line 4—4 of the apparatus of FIGURE 3.
Figure 7:
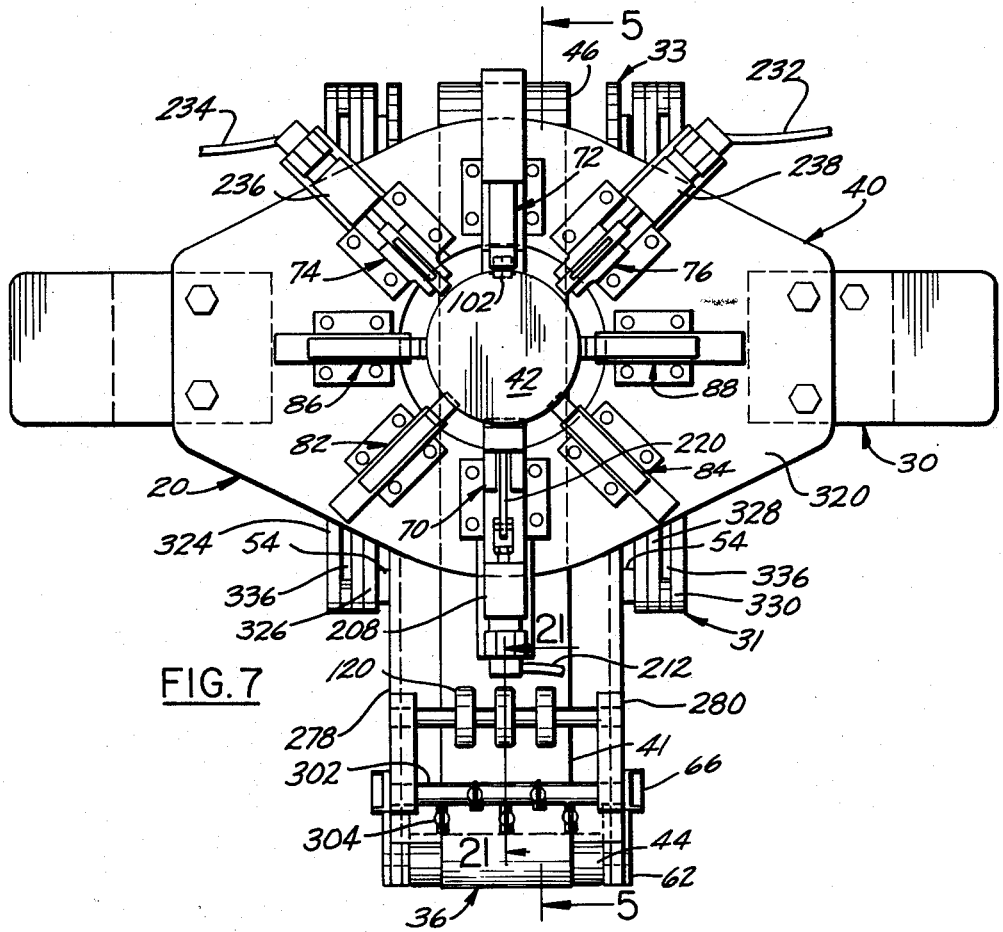
FIGURE 7 is a plan view of the apparatus of FIGURE 3.
Figure 8:
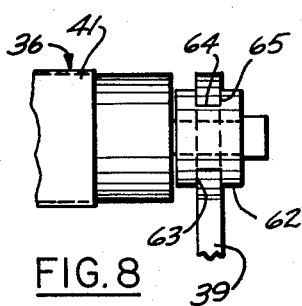
FIGURE 8 is a partial end elevational view of the conveyor of FIGURE 5.
Figure 9:
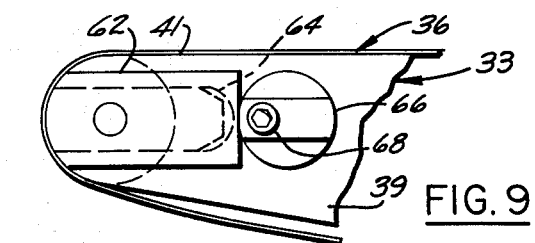
FIGURES 9 and 10 are partial side elevational views of the free end of the conveyor of FIGURE 5 which show a belt tightening mechanism comprising for the conveyor.
Figure 10:
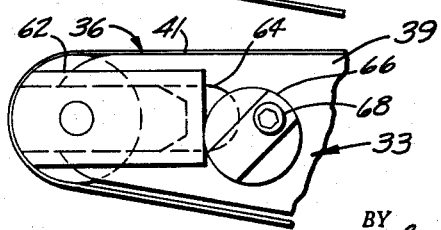
Figure 19:
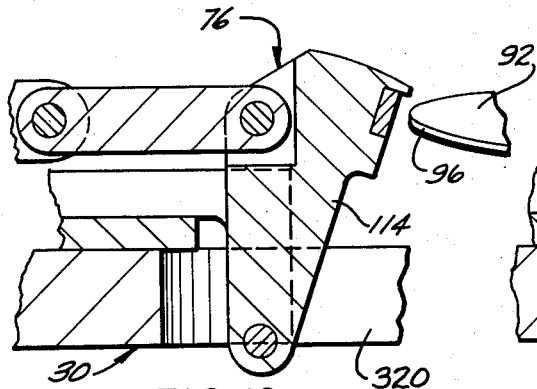
Figure 20:
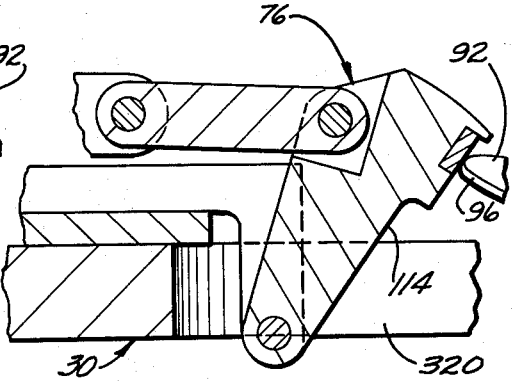
Figure 21:
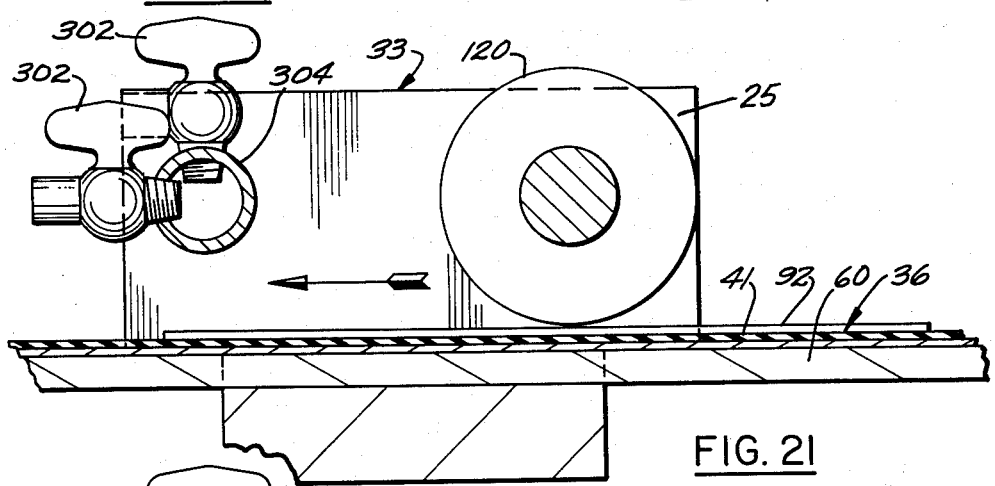
Figure 22:
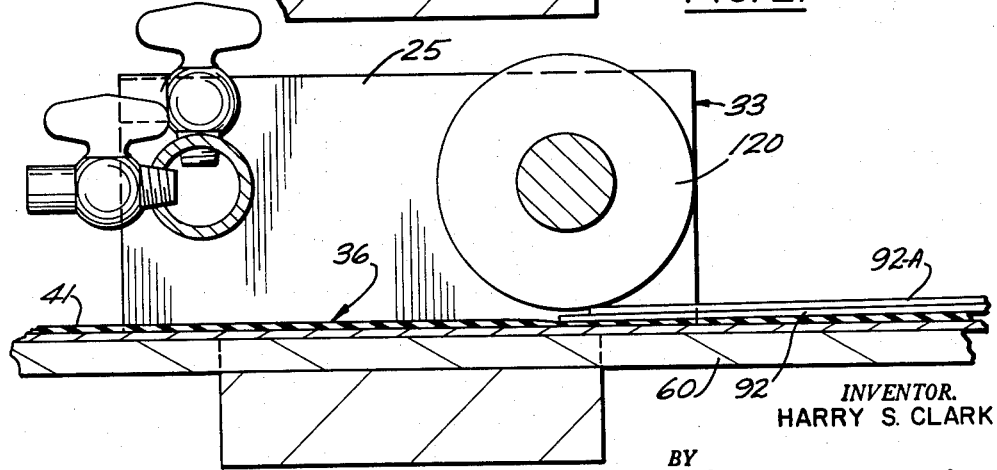
Figure 23:
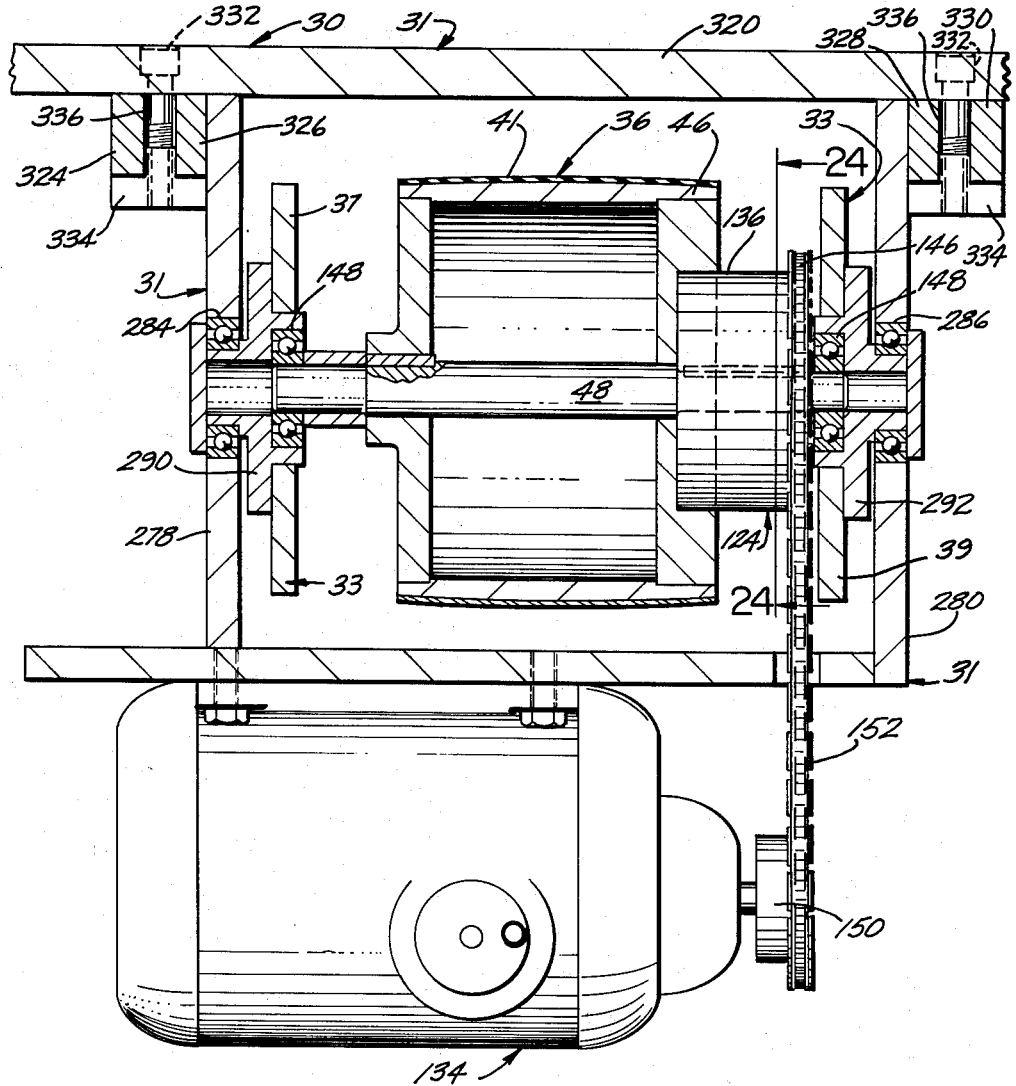
Figure 29:
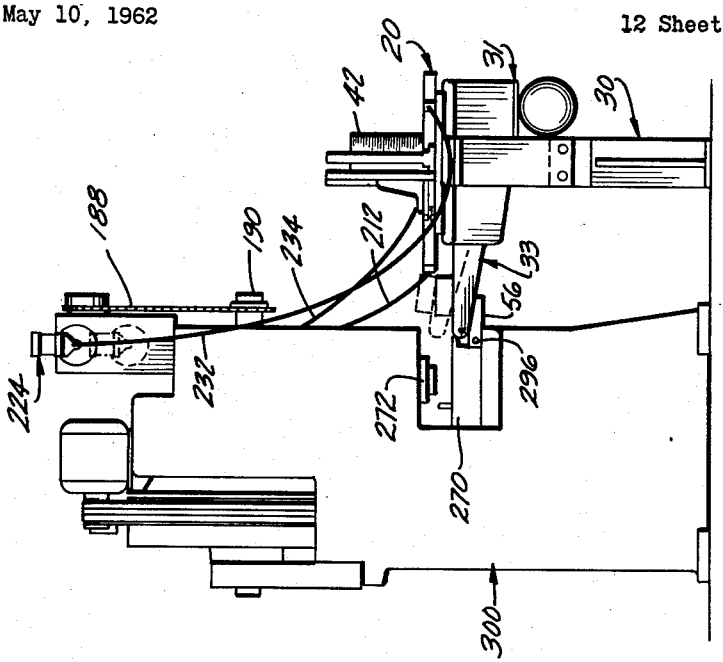
Figure 28:
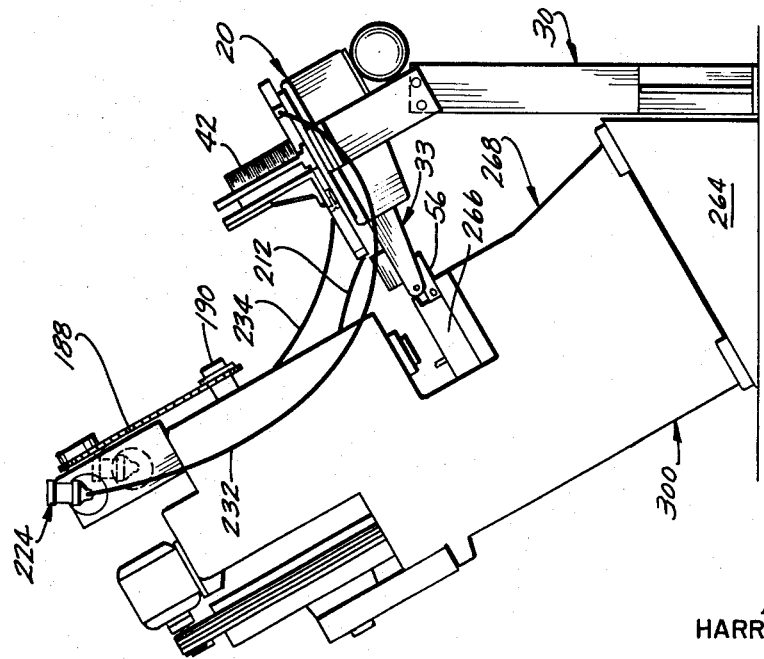

FIGURE 18 is a partial side elevational view showing the pusher means and gate means of FIGURES 11-13, the section being taken along lines 16—16 and 17—17 of FIGURES 11 and 12;

FIGURES 19 and 20 are side sectional views showing the kicker means of the mechanism of FIGURES 11-13, the section being taken along the line 19—19 and 20—20 of FIGURES 12 and 13;

FIGURES 21 and 22 are side elevational views, taken along line 21—21 of FIGURE 7, showing a work piece arresting means for preventing more than one work piece from being delivered from the endless conveyor to the associated machine;

FIGURE 23 is a front sectional view of the endless conveyor of the preceding figures, the sections being taken along the line 23—23 of FIGURE 4;

FIGURES 24 and 25 are side sectional views showing a clutch mechanism for automatically disengaging the drive for the endless conveyor, the section being taken along the line 24—24 of FIGURE 23;

FIGURE 26 is a front elevational view of an actuating means for pushers and kicker means of FIGURES 11-13;

FIGURE 27 is a side elevational view, in partial section, of the actuating means of FIGURE 26;

FIGURE 28 is a side elevational view of a modified press showing the work piece feeding apparatus of the present invention mounted thereon; and FIGURE 29 is a side elevational view of a second modified press showing the work piece feeding apparatus of the present invention mounted thereon.

Figure 2:
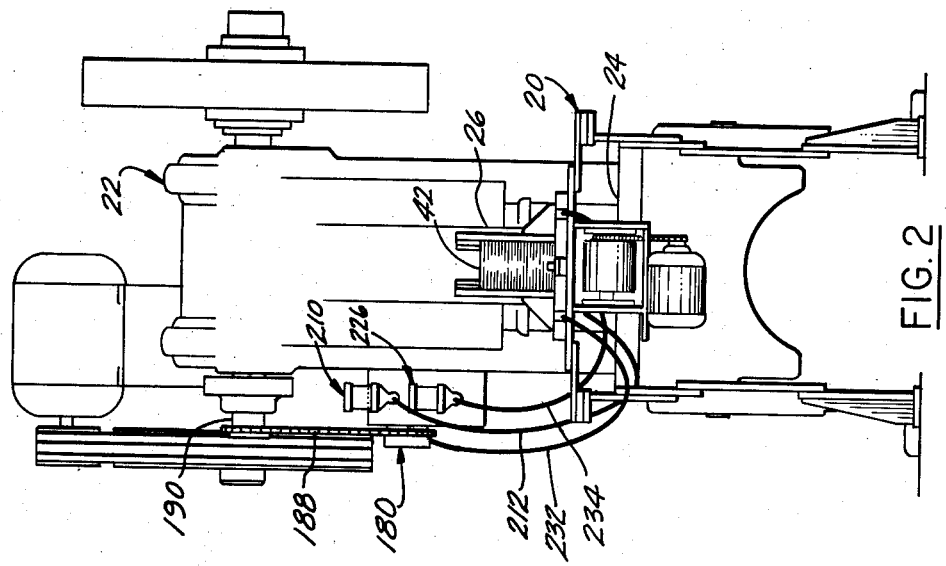
FIG. 2 is a front elevational view of the work piece feeding apparatus and associated punch press of FIGURE 1.
Figure 1:
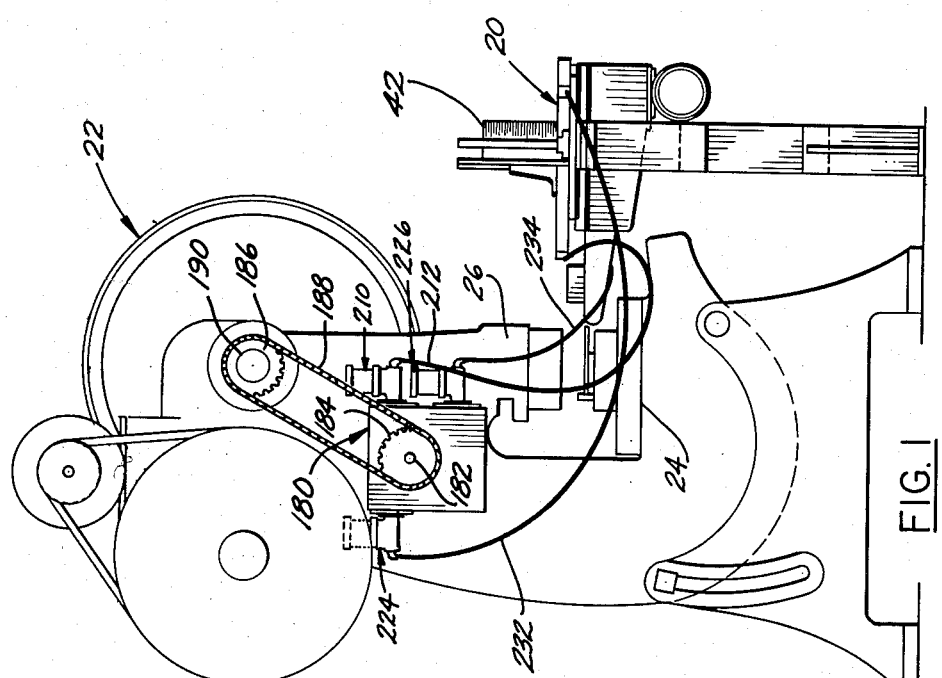
FIG. 1 is a side elevational view of a work piece feeding apparatus and associated punch press said apparatus being constructed in accordance with the present invention.

Referring in detail to the drawings, FIGURES 1 and 2 illustrate a work piece feeding apparatus indicated generally at 20 which is mounted in associated relationship with a conventional punch press indicated generally at 22.

In general, apparatus 20 sequentially feeds work pieces to a die means 24 mounted on the punch press in synchronized relationship with the reciprocating movement of a ram 26 of the press.

Figure 3:
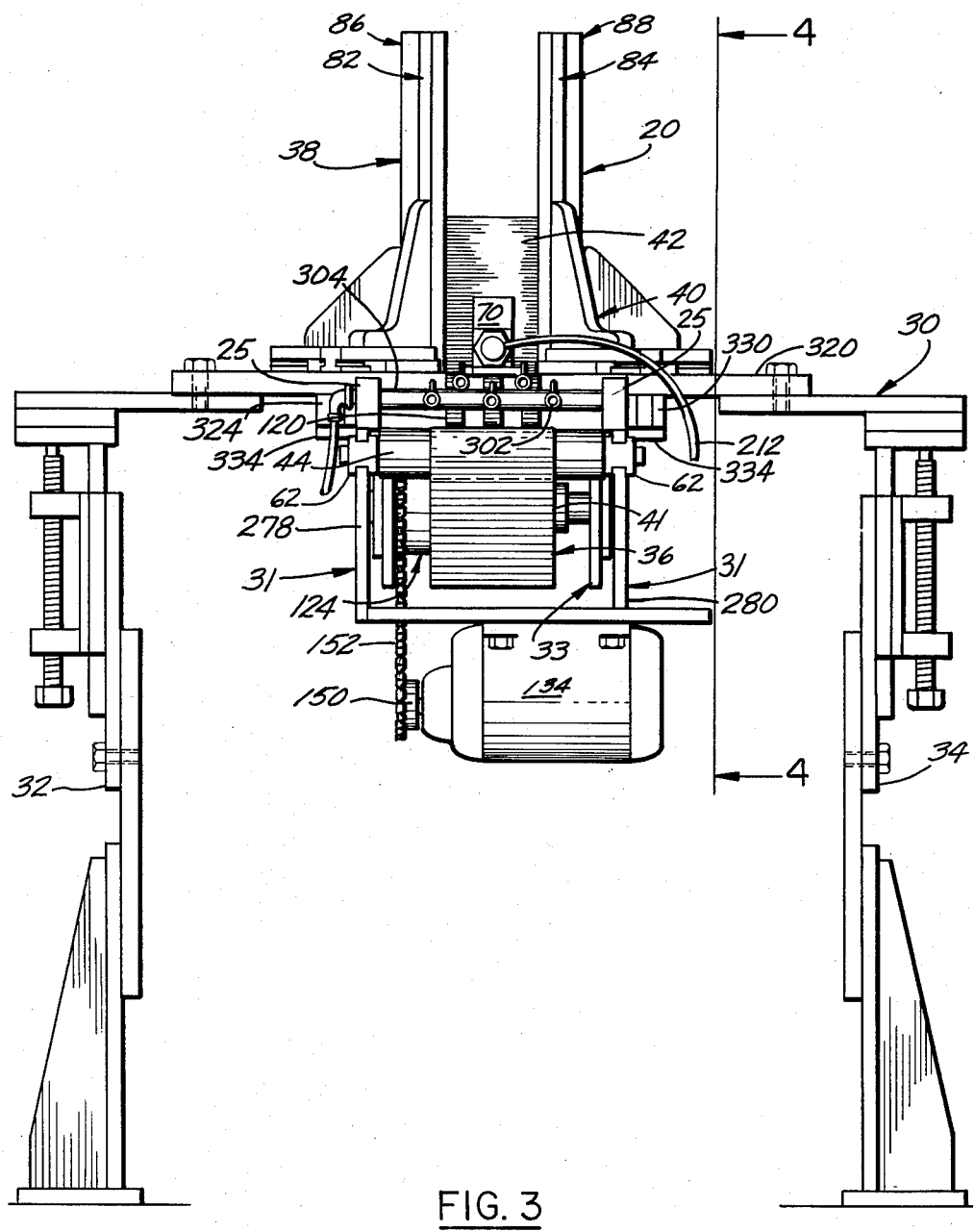
FIGURE 3 is an elevational view of the work piece feeding apparatus constructed in accordance with the present invention.

FIGURE 3 is an enlarged front elevational view of the work piece feeding apparatus 20 which comprises a frame means indicated generally at 30 that includes main frame 31 having upright supports 32 and 34, and an auxiliary frame indicated generally at 33. Auxiliary frame 33 carries an endless conveyor indicated generally at 36, a guide means 38 for supporting a stack of articles 42, and a work piece releasing mechanism indicated generally at 40.

Figure 5:
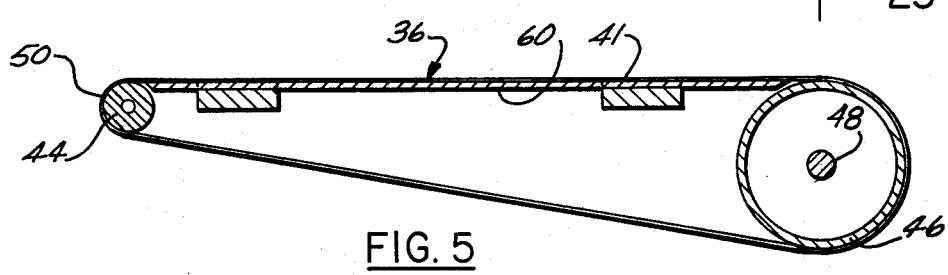
FIGURE 5 is a side sectional view illustrating an endless conveyor comprising a portion of the apparatus of the preceeding figures. The section being taken along the line 5—5 of FIGURE 7.

With reference to FIGURES 4 and 5, endless conveyor 36 is mounted on auxiliary frame 33 that includes side plates 37 and 39, FIGURES 4 and 23, and a belt 41 carried on a front pulley 44 and a rear pulley 46. Rear pulley 46 is mounted on a shaft 48 journaled on side plates 37 and 39 which are in turn pivotally mounted on main frame 31 at bearings 284 and 286 whereby a free end 50 of the conveyor is free to oscillate vertically when a lock pin 52, FIGURE 4, is pulled out of engagement with a hole in a wear plate 54 carried by frame means 30.

When the apparatus is used to feed work pieces to a stationary die means pin 52 is disposed in latched engagement with wear plate 54 whereby the free end 50 of auxiliary frame 31 anchored against vertical movement. When, however, the free end 50 of the auxiliary frame is attached to the oscillating portion of an associated machine by means of a bracket 56 provided with a hole 58, FIGURES 6 and 29, then lock pin 52 is pulled out of engagement with wear plate 54 to permit vertical oscillation of the free end of the conveyor.

Referring again to FIGURE 5 the upper portion of belt 41 overlies a magnetic strip 60 which serves to retain the work pieces in position on the upper surface of the conveyor.

Figure 6:
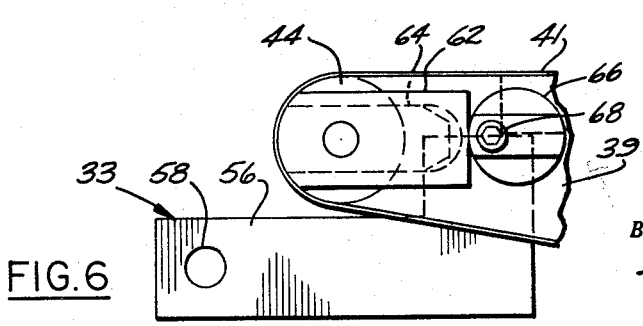
FIGURE 6 is a partial side elevational view of the endless conveyor of FIGURE 5 showing a mounting bracket for attaching the free end of the conveyor to an associated machine.

Referring to FIGURE 6, front pulley 44 is mounted on pulley mounting blocks 62 having grooves 63 and 64 slideably mounted on tongues 65 formed on plates 37 and 39. Rotation of an eccentric 66 mounted on drive pin 68 serves to extend pulley mounting block 62 for the purpose of tightening belt 41.

Reference is next made to FIGURES 7 and 11 through 18 which illustrate in detail the work piece releasing mechanism previously shown generally at 40 in FIGURES 3 and 4. As seen in FIGURE 7, the mechanism includes a pusher means indicated generally at 70, a gate means indicated generally at 72, a pair of kicker means indicated generally at 74 and 76 respectively, and a plurality of work piece supporting means indicated generally at 84, 86 and 88.

With reference to FIGURES 3, 7 and 23, auxiliary frame 33 is longitudinally slideably mounted on main frame 31 by means of a pair of left spaced rails 324 and 326 and a pair of right spaced rails 328 and 330 which rails are rigidly fastened to auxiliary frame side plates 278 and 280. As is best seen in FIGURE 23 the right and left pairs of rails are suspended from main frame 31 by T-plates 334 secured to a main frame top plate 320 by a plurality of studs 332 that extend through slots 336 formed by the spaced rails 324—326 and 328—330. This slideable mounting of auxiliary frame 33 permits freedom for pivotal movement of the auxiliary frame when its free end 50 is attached to an oscillating press member as described with respect to the modification of FIG. 29.

FIGURE 11 illustrates the work piece releasing mechanism in its normal configuration prior to the releasing cycle wherein pusher means 70 is in its normal retracted position of FIGURE 14 wherein a work piece supporting surface 90 is disposed under the edge of a lowermost article 92 stack 42 and a shoulder 94 confronts the edge 91 of the lowermost article and extends upwardly above work piece supporting surface 90 for a distance less than the thickness of the lowermost work piece. When pusher means 70 is actuated, by a fluid motor later to be described, it moves from the position of FIGURE 14 to the position of FIGURE 15 and thereby shifts lowermost work piece 92 to the right, as viewed in FIGURE 15.

The shifted position of lowermost work piece 92 is illustrated in FIGURES 12 and 17 where it will be seen that the rear edge 96 has been moved between an upper jaw means in the form of a spring pressed member 100 and a lower jaw means in a form of a roller 102. Upper jaw means 100 is pivotally mounted on pin 99 and is constantly urged downward by a compression spring 104 mounted on an adjustable spring retainer pin 106.

The next operation of the work piece releasing mechanism is illustrated in FIGURES 13 and 18–20 where it will be seen that after a rear edge 96 of lowermost work piece 92 is moved between upper and lower jaw means 100 and 102 pusher means 70 retracts from position of FIGURE 15 to the position of FIGURES 14 and 18 whereby a front edge 91 of lowermost work piece is released, as seen in FIGURE 18. The two kicker means 74 and 76, FIGURES 13, 19 and 20, are actuated by a fluid motor, later to be described, whereby the pivoted members 114 strike the rear edge 96 of lowermost work piece 92 and force the edge of the work piece outwardly from between upper and lower jaw members 100 and 102, FIGURE 18, whereby the work piece falls downwardly on the upper surface of the endless conveyor 36 and is retained in position by magnetic underplate 60.

The pivoted members 114 of the two kicker means 74 and 76 are next retracted and the next to the lowermost work piece 116 drops onto article supporting surface 90 of the pusher means and roller 102 that forms lower jaw means 102.

It should also be pointed out that the lowermost work piece is supported on inwardly extending shoulders 120 and 122, FIGURES 11–13, provided on the inner ends of the two supporting means 82 and 84 which lie on either side of pusher means 70.

The article supporting apparatus includes two additional vertically extending guides, FIGS. 11–13, for the stack which are indicated generally at 86 and 88, respectively. These guides include inwardly extending shoulders 126 and 128 that are spaced apart a distance greater than the diameter of the work pieces so that the work pieces can drop downwardly when the front edges 91 thereof are pushed off the supporting shoulders 120 and 122 by the pusher means 70.

Reference is next made to FIGS. 21 through 26 which illustrate a novel automatic clutch apparatus indicated generally at 124 for arresting the movement of endless conveyor 36 in the event that more than one work piece is dropped on the conveyor 36 by the previously described work piece releasing mechanism.

Clutch apparatus 124 comprises idler pulley 120, FIGS. 3, 21 and 22, journaled for rotation on plates 25 carried by auxiliary frame 33. Idler pulleys 120 are spaced above the top surface of conveyor belt 36 a distance greater than the thickness of two of the work pieces 92 and less than the thickness of two of the work pieces 92 and 92A as is illustrated in FIGS. 21 and 22. When two of the work pieces are delivered to idler pulleys 120 clutch apparatus 124, FIGS. 3, 23 and 25, disengages belt pulley 46, from driven relationship with a motor 134. This is accomplished by the movement of a latch member 135 from the engaged position of FIG. 24 to the disengaged position of FIG. 25. Latch member 135 is pivotally mounted on a clutch housing 136 which is normally urged toward latched engagement with the shaft by a compression spring 144.

A sprocket 146 is mounted on clutch housing 136 and therefore continuously driven by a motor 134, drive sprocket 150, chain 152 and driven sprocket 146. When, however, two work pieces move under idler pulleys 120, as seen in FIG. 22, a frictional arresting force is imposed on conveyor belt 41 whereby element 135 moves out of notch 140 in shaft 48 from the position of FIG. 24 to the position of FIG. 25. When this occurs, latch element 135 is retained in the unlatched position of FIG. 25 by a latch lock out member 156 pivotally mounted on clutch housing 136 at a pivot pin 158.

The latch member 135 is returned to the driving position after the jammed work pieces are removed from beneath the idler pulleys 120, FIG. 22, screwing in a latch release screw 162, FIGS. 24 and 25, to lift a shoulder 164 on lock out member 156 out of a notch 166 in the end of latch pin 135.

As seen in FIGS. 24 and 25, a compression spring 170 constantly urges latch lock out member 156 towards the position of latched engagement with latch member 135.

As seen in FIGS. 24 and 25, the clutch apparatus includes a limit switch actuating pin 174 slidably extended through a bore 176 in the clutch housing and pivotally attached to latch member 135 at a pivot pin 178. Since, upon jamming of the machine, latch member 135 is kicked out of engagement with notch 140 the pivotal movement of latch member 135 extends actuating pin 174 outwardly into engagement with a suitable limit switch, not illustrated, that can be mounted in series with the motor that drives the machine to which the work pieces are being delivered.

Reference is next made to FIGS. 1, 2, 26 and 27 which illustrate a driving mechanism for the work piece releasing apparatus of FIGS. 7–17. This driving mechanism is indicated generally at 180 and includes a shaft 182 that carries a sprocket 184 driven by a sprocket 186 and a chain 188, FIG. 1, the former being mounted on a main shaft 190 that actuates the ram of the punch press indicated generally at 22.

As is best seen in FIG. 27, shaft 182 carries a cam 192 that actuates follower levers 194 and 196 pivotally mounted on a drive housing 200 at the pivot pins 202 and 204, respectively.

With continued reference to FIGS. 7 and 27, the previously described pusher 70 is actuated by a hydraulic cylinder 208 that is connected in an oscillating hydraulic circuit with a plunger type hydraulic pump, indicated generally at 210, by a single line 212. Each time a lobe 214 on cam 192 engages follower lever 196 a plunger rod 216 of pump 210 is extended whereby liquid is expelled from the cylinder of the pump and delivered to the cylinder of hydraulic cylinder 208 whereby a link 220 actuates pivoted member 95, FIGS. 14 and 15, and pushes the lowermost workpiece into position between the joints, FIG. 18, of gate 72 in the manner previously described.

With continued reference to FIGS. 7 and 27, when the lobe 214 on cam 192 engages the side of follower lever 194, two kicker pumps indicated generally at 224 and 226 are actuated by the extension of the plunger rods 228 and 230 whereby charges of liquid are delivered via lines 232 and 234 to two respective hydraulic cylinders 236 and 238 via two oscillating liquid circuits provided by lines 232 and 234.

Referring again to FIGS. 26 and 27, the actuation of pusher and kicker pumps 210, 224 and 226 can be synchronized with the cyclical movement of the ram of the punch press, FIG. 1, by a sprocket lock pin 242 which is slidably mounted in sprocket mounting pulley 244 mounted on shaft 182 by the key 246. The end of lock pin 242 is removably extended into one of a plurality of sprocket holes 252 formed in a sprocket collar 248 attached to sprocket 184. When pin 242 is withdrawn from sprocket collar 184, the collar and sprocket can be rotated on shaft 182 to selectively position another one of the holes 252 in the sprocket collar with one of the plurality of pin mounting holes 250 in pulley 244.

With reference to FIGS. 6, 28 and 29, each of the pumps 224, 226 and 210 includes a reservoir 254 for supplying liquid to the pump cylinders and, since it is important to keep the fluid reservoirs 254 level, each of pumps includes a mounting flange 256, FIGS. 26 and 27, provided with arcuate slots 258 and locking studs 260, the latter serving to position and retain the pumps 210, 224 and 226 in a level configuration when the drive apparatus is mounted on an inclined punch press of the type illustrated generally at 268 in FIG. 28. Punch presses of this type are commonly used in certain foreign countries and differ from the conventional domestic type in that their frames are mounted on inclined blocks as is illustrated at 264 in FIG. 28. Here it will be seen that the die 266 on the inclined type punch press 268 is inclined whereby it is necessary to position the work piece feeding apparatus in a corresponding inclined configuration.

FIG. 29 illustrates still another type punch press which includes a vertically moveable die means 270 that is reciprocated up and down relative to a stationary die means 272. In the embodiment of FIG. 29 the previously described auxiliary frame 33, which includes side plates 278 and 280, has its free end mounted to moveable die means 270 of the modified press 300 at a pivot pin 296. Hence it will be understood that when die means 270 oscillates vertically, the conveyor pivots about the centers of bearings 284 and 286.

If desired, plurality of compressed air outlet valves 302 mounted on air line 304 can be provided with air hoses leading to the die means of the press whereby jets of air at timed intervals to give further work piece nesting control. Air line 304 is mounted to the frame by two air line supports 25 illustrated in FIG. 3.

While the forms of embodiments of the present invention as herein disclosed constitute preferred forms, it is to be understood that other forms might be adopted, all coming within the scope of the claims which follow.

I claim:

1. An apparatus for feeding metal work pieces comprising, in combination, frame means; an endless conveyor mounted on said frame means; guide means for positioning a stack of said work pieces above said conveyor; pusher means moveably mounted on said frame means and including an upstanding shoulder engageable with a first edge of the lowermost work piece in said stack; gate means moveably mounted on said frame means and including jaw portions for receiving and clamping a second edge of said lowermost work piece; kicker means mounted on said frame means for ejecting said lowermost work piece from said jaw portions whereby said lowermost work piece drops downwardly onto said endless conveyor; driving means for said endless conveyor; actuating means for said pusher means; and actuating means for said kicker means.

2. The apparatus defined in claim 1 wherein said pusher means includes a supporting surface that underlies said first edge of said lowermost work piece, said shoulder being extended upwardly from said surface for a distance less than the thickness of said work pieces.

3. The apparatus defined in claim 1 wherein one of said jaw portions of said gate means is formed by a roller underlying said second edge of said lowermost work piece and the other of said jaw portions is formed by a spring pressed member overlying said roller.

4. The apparatus defined in claim 1 wherein said guide means includes two work piece supporting shoulders underlying the edge of said lowermost work piece, said pusher means being mounted intermediate said two supporting shoulders.

5. The apparatus defined in claim 1 wherein said kicker means includes two ejector members, said gate means being mounted intermediate said two ejector members.

6. The apparatus defined in claim 1 wherein said drive means for said endless conveyor includes first and second shafts, a first clutch portion on said first shaft, a second clutch portion on said second shaft, and means yieldingly urging said clutch portions into driving engagement; and a member overlying the upper surface of said endless conveyor and spaced therefrom a distance greater than the thickness of one of said work pieces but less than the thickness of two of said work pieces.

7. The apparatus defined in claim 1 wherein said endless conveyor is pivotally mounted on said frame means, and includes a free end; and means for attaching said free end to the vertically reciprocating portion of an adjacently positional machine.

8. The apparatus defined in claim 1 wherein certain of said actuating means includes a shaft means; means for driving said shaft means in timed relationship with a machine to which said work pieces are fed; a fluid pump driven by said shaft means; and a fluid motor connected with said fluid pump for actuating certain of said pusher and kicker means.

9. An apparatus for feeding metal work pieces comprising, in combination, frame means including a main frame and an auxiliary frame pivotally mounted on said main frame, said auxiliary frame including a free end for attachment to an oscillating portion of an associated machine; an endless conveyor mounted on said auxiliary frame; guide means on said frame means; pusher means moveably mounted on said frame means and including an upstanding shoulder engageable with a first edge of the lowermost work piece in said stack; gate means moveably mounted on said frame means and including jaw portions for receiving and clamping a second edge of said lowermost work piece; kicker means mounted on said frame means for ejecting said lowermost work piece from said jaw portions whereby said lowermost work piece drops downwardly onto said endless conveyor; driving means for said endless conveyor; actuating means for said pusher means; and actuating means for said kicker means.

10. An apparatus for feeding metal work pieces comprising, in combination, frame means including a main frame and an auxiliary frame slideably mounted on said main frame; an endless conveyor mounted on said auxiliary frame; guide means on said frame means; pusher means moveably mounted on said frame means and including an upstanding shoulder engageable with a first edge of the lowermost work piece in said stack; gate means moveably mounted on said frame means and including jaw portions for receiving and clamping a second edge of said lowermost work piece; kicker means mounted on said frame means for ejecting said lowermost work piece from said jaw portions whereby said lowermost work piece drops downwardly onto said endless conveyor; driving means for said endless conveyor; actuating means for said pusher means; and actuating means for said kicker means.

11. The apparatus defined in claim 10 wherein said auxiliary frame is pivotally mounted on said main frame.

12. An apparatus for feeding metal work pieces comprising, in combination, frame means; an endless conveyor mounted on said frame means; guide means for positioning a stack of said work pieces above said conveyor; pusher means moveably mounted on said frame means and including an upstanding shoulder engageable with a first edge of the lowermost work piece in said stack; gate means moveably mounted on said frame means and including jaw portions for receiving and clamping a second edge of said lowermost work piece; kicker means mounted on said frame means for ejecting said lowermost work piece from said jaw portions whereby said lowermost work piece drops downwardly onto said endless conveyor; driving means for said endless conveyor; a fluid actuated cylinder for operating certain of said pusher and kicker means; actuator means including an actuator frame rotatably supporting a driven shaft; cam means on said shaft; pump means including an actuator; a follower lever engaging said cam and said actuator; and conduit means connecting said pump with said motor.

13. The apparatus defined in claim 12 wherein said pump means includes a reservoir chamber rotatably mounted on said actuator frame; and means for locking said reservoir in various positions of rotation on said actuator frame.

References Cited in the file of this patent

UNITED STATES PATENTS

| | | |
|---|---|---|
| 2,713,406 | Babaian | July 19, 1955 |
| 2,744,551 | Burkholder | May 8, 1956 |